United States Patent
Chiang et al.

(10) Patent No.: US 12,174,387 B1
(45) Date of Patent: Dec. 24, 2024

(54) OPTICAL LENS AND HEAD-MOUNTED DISPLAY

(71) Applicants: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Chen-An Chiang, Hsinchu (TW); Ying-Hung Tsai, Hsinchu (TW); Chung-Wu Liu, Hsinchu (TW)

(73) Assignees: Asphetek Solution (Chengdu) Ltd., Chengdu (CN); ADVANCED OPTOELECTRONIC TECHNOLOGY, INC., Hsinchu County (TW); Asphetek Solution Inc., Hsinchu County (TW)

( * ) Notice: Subject to any disclaimer, the term of this patent is extended or adjusted under 35 U.S.C. 154(b) by 0 days.

(21) Appl. No.: 18/530,674

(22) Filed: Dec. 6, 2023

(30) Foreign Application Priority Data

Nov. 8, 2023 (CN) .......................... 202311489600.4

(51) Int. Cl.
  *G02B 27/01* (2006.01)
  *G02B 27/09* (2006.01)
(52) U.S. Cl.
  CPC ..... *G02B 27/0172* (2013.01); *G02B 27/0955* (2013.01)

(58) Field of Classification Search
  CPC ...... G02B 13/18; G02B 15/14; G02B 25/001; G02B 2027/0178; G02B 13/003
  See application file for complete search history.

(56) References Cited

U.S. PATENT DOCUMENTS

| | | | |
|---|---|---|---|
| 10,859,837 B2 * | 12/2020 | Adema | G02B 27/0081 |
| 2015/0316748 A1 * | 11/2015 | Cheo | G02B 13/004 |
| | | | 359/694 |
| 2015/0359675 A1 * | 12/2015 | Wilson | B32B 27/365 |
| | | | 2/431 |
| 2017/0339392 A1 * | 11/2017 | Forutanpour | H04N 13/161 |
| 2018/0074323 A1 * | 3/2018 | Wheelwright | G02B 3/08 |
| 2019/0377122 A1 * | 12/2019 | Danziger | G02B 6/0033 |
| 2020/0124853 A1 * | 4/2020 | Lo | G02B 27/106 |
| 2023/0097317 A1 * | 3/2023 | Motoyama | G02B 3/0062 |
| | | | 257/40 |

FOREIGN PATENT DOCUMENTS

| CN | 111610646 A | 9/2020 |
|---|---|---|
| TW | M401131 U | 4/2011 |

\* cited by examiner

*Primary Examiner* — Kevin M Nguyen
(74) *Attorney, Agent, or Firm* — ScienBiziP, P.C.

(57) ABSTRACT

Embodiments of the present disclosure relates to an optical lens and a HUD using the optical lens. The optical lens includes a first lens, a second lens, and an optical waveguide. The first lens includes at least two focal parts with different powers. Since the HUD utilizes the optical lens, the user can maintain a comfortable viewing effect when wearing the HUD for a long time.

20 Claims, 8 Drawing Sheets

OPTICAL LENS AND HEAD-MOUNTED DISPLAY

FIELD

The subject matter herein generally relates to near-eye displays (NEDs), specifically optical lenses and head-mounted displays (HUDs) using the optical lenes.

BACKGROUND

Augmented reality (AR) technology is a technology that integrates virtual information and the real world into AR images. AR technology has gradually penetrated entertainment, education, medical, and other industries. Currently, the main equipment for realizing AR technology includes NEDs, such as smart glasses, smart helmets, and other HUDs.

However, in the existing HUDs, optical lenses only have a single focal part, and the optical lenses cannot zoom. When looking at close distances, the user's eyeballs can only be in a cohesive state. Therefore, when a user wears the HUD for a long time, the eyes are likely to feel tired and dizzy, and may even cause abnormal binocular vision function, making it impossible to directly use the HUD.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
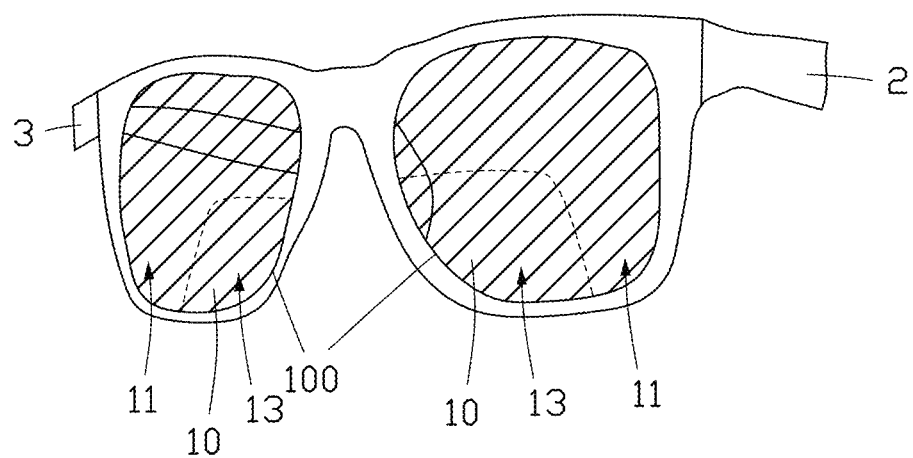
FIG. 1 is a schematic structural diagram illustrating a HUD according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to;" it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 5:
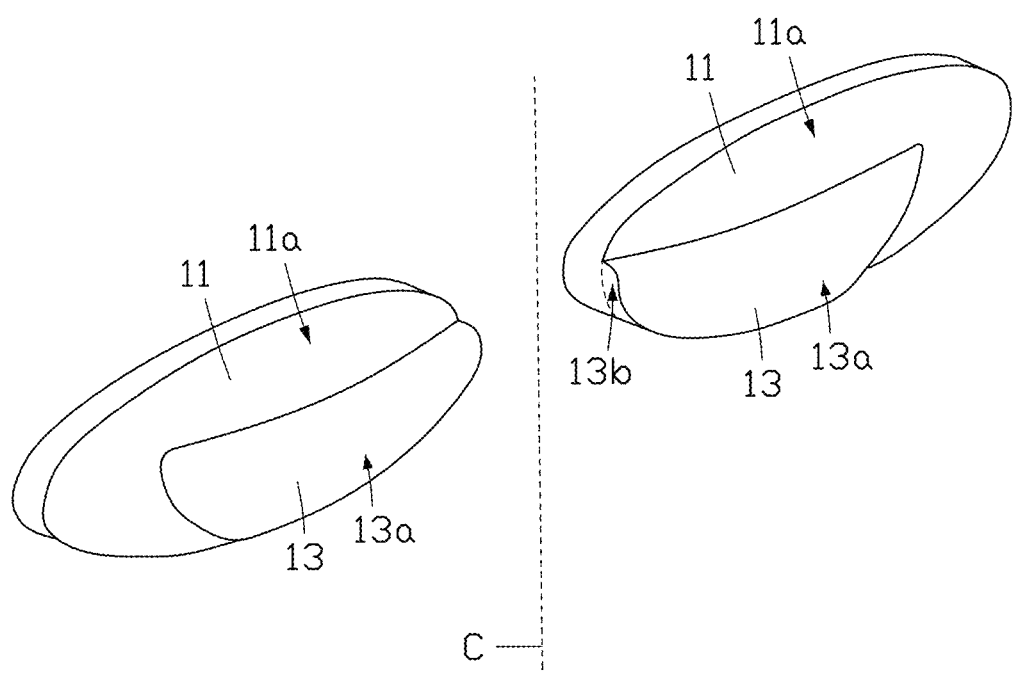
FIG. 5 is a schematic perspective view illustrating two first lenses of the optical lenses in FIG. 1.

As shown in FIG. 1, an HUD 1 includes two optical lenses 100. By wearing the HUD 1 on the head, the user can observe AR images through the optical lenses 100. The two optical lenses 100 have mutually independent optical paths, basically the same structure and working principle, and are respectively used to display the AR image to the user's left eye and right eye. Each optical lens 100 includes a first lens 10. As shown in FIG. 5, the two first lenses 10 are symmetrical. When the user wears the HUD 1, a symmetry axis C of the two first lenses 10 is between the left eye and the right eye of the user.

The HUD 1 further includes a frame 2 and an optical engine 3. The frame 2 fixes the optical lenses 100. The frame 2 includes spectacle frames, temples, and other structures. The optical engine 3 is arranged on the frame 2 and is on a side of the optical lenses 100. In other embodiments, the optical engine 3 may be on the top of each optical lens 100.

Figure 2:
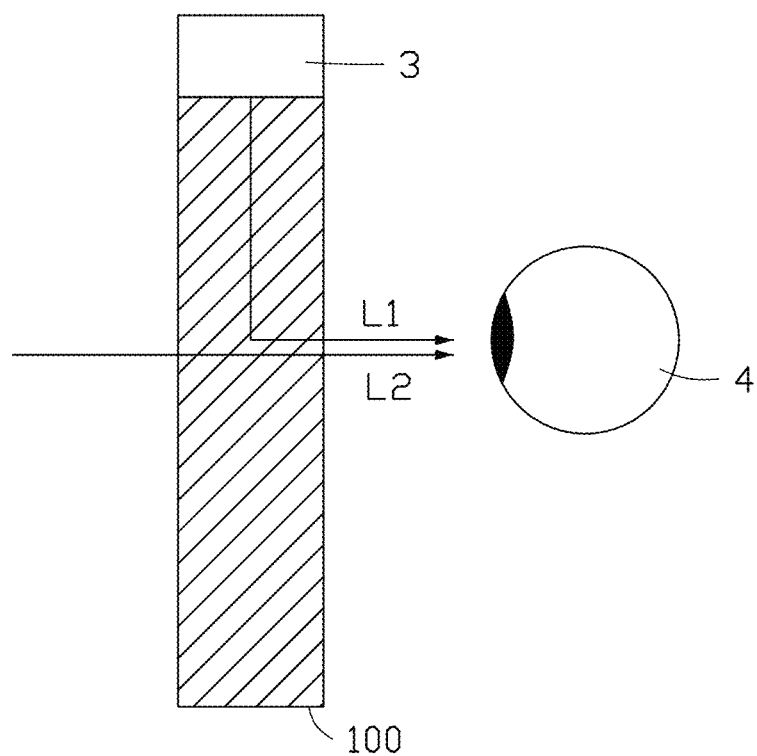
FIG. 2 is a functional schematic diagram illustrating the HUD in FIG. 1.

As shown in FIG. 2, image light L1 emitted by the optical engine 3 is transmitted to the user's eyeball 4 through the optical lenses 100. The natural light L2 from the real world passes through the optical lens 100 and merges with the image light L1 to form the AR image. Natural light L2 is directly transmitted into the eyeball 4 through the optical lens 100. The optical engine 3 may be a light emitting diode optical engine.

Figure 3:
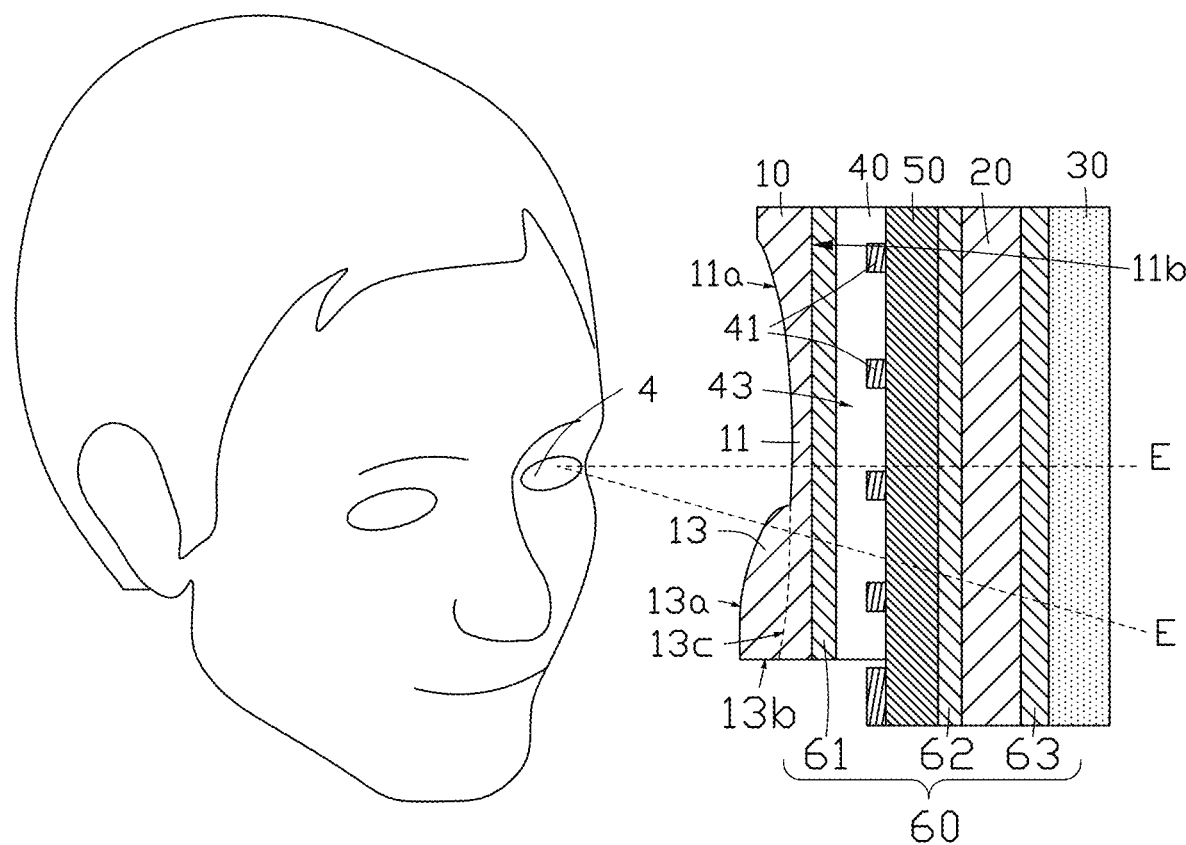
FIG. 3 is a schematic structural diagram illustrating an optical lens according to an embodiment of the present disclosure.

As shown in FIG. 3, the optical lens 100 further includes a second lens 20, an optical waveguide 30, a light emitting layer 40 and a functional film layer 50. The optical waveguide 30 is on a side of the first lens 10. The second lens 20 is between the optical waveguide 30 and the first lens 10. The functional film layer 50 is between the first lens 10 and the second lens 20. The light emitting layer 40 is between the functional film layer 50 and the first lens 10. When the user wears the HUD 1, the optical waveguide 30 is farthest away from the eyeball 4 and the first lens 10 is closest to the eyeball 4.

Figure 4:
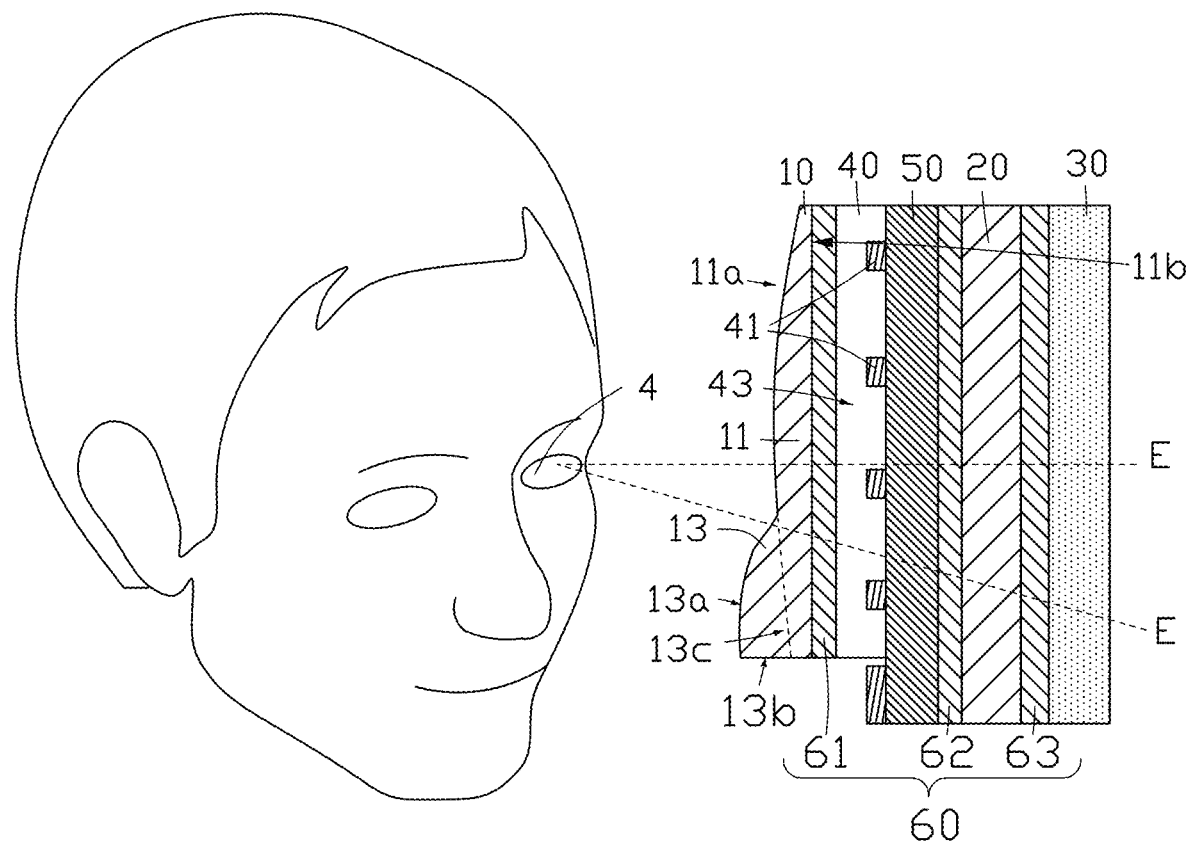
FIG. 4 is a schematic structural diagram illustrating an optical lens according to another embodiment of the present disclosure.

The first lens 10 includes at least two focal parts with different powers, and the power of each focal part is numerically equal to 100 times the reciprocal of the focal length of the focal part. The first lens 10 is a bifocal lens, which has two focal parts with different powers. Specifically, the first lens 10 includes an upper focal part 11 and a lower focal part 13 that are connected to each other. The lower focal part 13 is on a side of the upper focal part 11 away from the second lens 20 (that is, closer to the eyeball 4). The upper focal part 11 and the lower focal part 13 are integrally formed. The upper focal part 11 is a convex lens or a concave lens, and the actual concavity and convexity can be selected according to whether the user is nearsighted or farsighted. When the upper focal part 11 is a convex lens, the center is thick and the edges are thin, which can meet the needs of farsighted users. When the upper focal part 11 is a concave lens, the center is thin and the edges are thick, which can meet the needs of nearsighted users. In FIG. 3, the upper focal part 11 is a concave lens. In FIG. 4, the upper focal part 11 is a convex lens. The lower focal part 13 is a prismatic convex lens and has a convex surface 13a and a side surface 13b. The upper focal part 11 has a first surface 11a and a second surface 11b opposite to the first surface 11a. The first surface 11a is a curved surface, and the second surface 11b is a plane. Specifically, in FIG. 3, the upper focus portion 11 is a concave lens, and the first surface 11a includes a concave portion that is concave toward one side of the second lens 20. In FIG. 4, the upper focus portion 11 is a convex lens, and the first surface 11a includes a convex portion protruding toward the side away from the second lens 20.

The lower focal part 13 is on the first surface 11a of the upper focal part 11 and covers the lower area of the first surface 11a relative to the eyeball 4. A projection of the side surface 13b on the second lens 20 coincides with a projection of the edge of the upper focal part 11 on the second lens 20 to ensure the flatness of the edge of the optical lens 100. In addition, the lower focal part 13 also has a third surface 13c. The third surface 13c completely coincides with a part of the first surface 11a. In one embodiment, the upper focal part 11 and the lower focal part 13 are integrally formed, and there is no real contact surface between the upper focal part 11 and the lower focal part 13. That is, the third surface 13c is a virtual surface. Specifically, when the user wears the HUD 1, the convex surface 13a is closer to the eyeball 4 relative to the third surface 13c, and the first surface 11a is located further away from the eyeball 4 relative to the third surface 13c. In the embodiments of FIGS. 3 and 4, a thickness of the lower focal part 13 gradually decreases from the edge position to the middle position of the upper focal part 11.

In other embodiments, the first lens 10 can be more precisely designed as a multifocal lens with more than two focal parts according to the actual needs of the user (such as strabismus). For example, the user's left eye and right eye can share one optical lens 100. That is, the lenses corresponding to the user's left eye and right eye are integrally formed. The degrees of the lower focal part corresponding to the user's left eye and the lower focal part corresponding to the user's right eye can be different. The degrees of the upper focal part corresponding to the user's left eye and the upper focal part corresponding to the user's right eye can be different. The lower focal part corresponding to the user's left eye, the lower focal part corresponding to the user's right eye, the upper focal part corresponding to the user's left eye and the upper focal part corresponding to the user's right eye are integrally formed. The optical lens 100 is a trifocal lens or a quadfocal lens.

Figure 6:
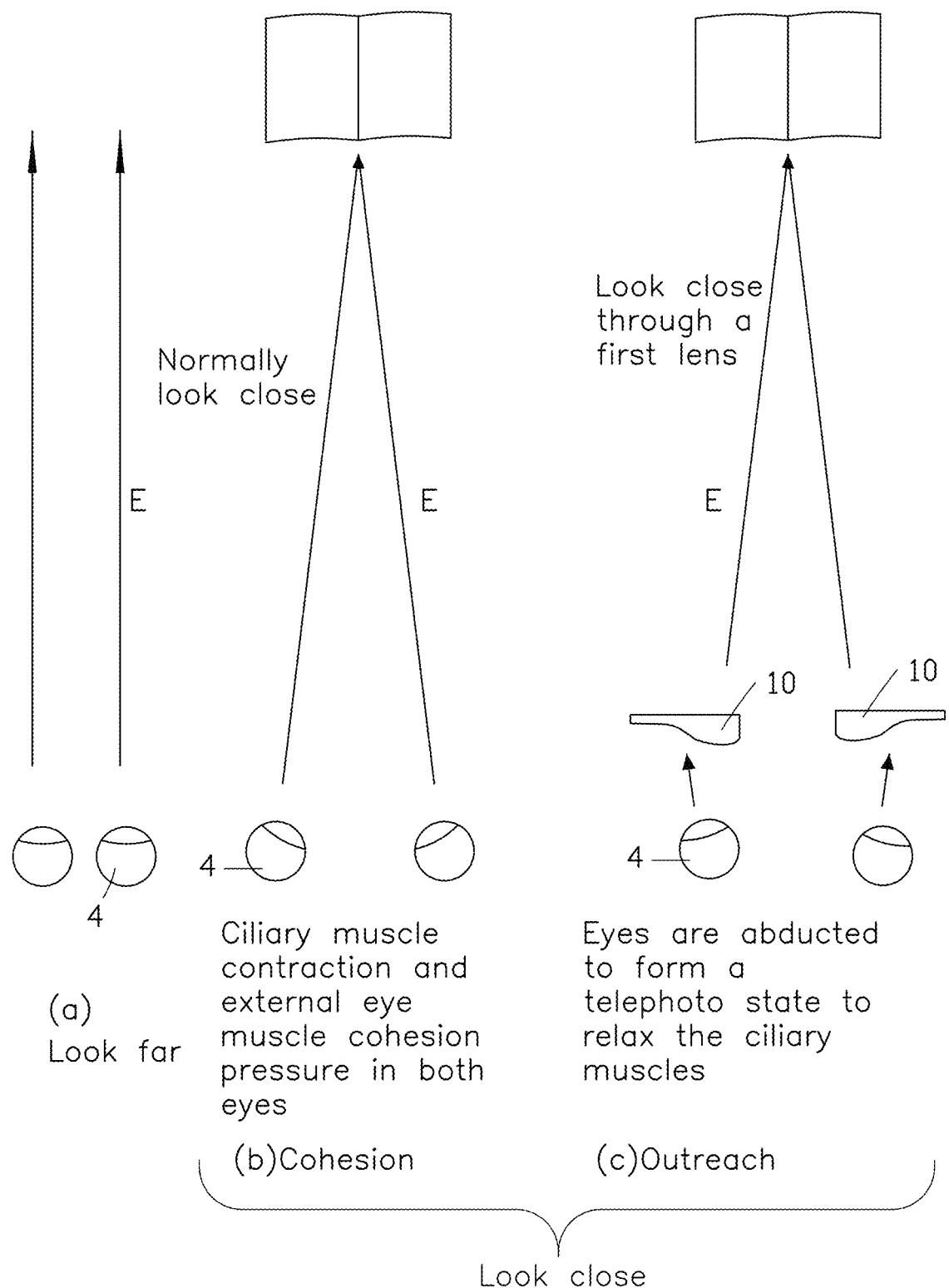
FIG. 6 is a functional schematic diagram illustrating the first lens in FIG. 3.

In the first lens 10, a power of the lower focal part 13 is greater than a power of the upper focal part 11. As shown in FIG. 6, the user's eyeball 4 is in an abducted state when viewing the AR image through the first lens 10. The line-of-sight E of the eyeball 4 mainly passes through the lower focal part 13, which means that the light entering the eyeball 4 mainly consists of the image light L1 and natural light L2 passing through the lower focal part 13. Since the power of the lower focal part 13 is greater than the power of the upper focal part 11, and the greater the power, the shorter the focal length, so that the eyeball 4 can see the nearby scenery clearly without converging when observing through the lower focal part 13. The lower focal part 13 can pull the eyeball's line-of-sight E when looking near to the distance, abducting the eyeball 4 to form a telephoto state, so that the muscles attached around the eyeball 4 can be relaxed when looking nearby. The muscles attached around the eyeball 4 include extraocular muscles that control the movement of the eyeball 4 and ciliary muscles that change the shape of the lens. Therefore, the first lens 10 is conducive to reducing the pressure on the eyeball 4 caused by the cohesion of the extraocular muscles and the contraction of the ciliary muscles, and relieves eye fatigue.

The power of the lower focal part 13 is 100 to 300 degrees greater than the power of the upper focal part 11, and the power of the lower focal part 13 is in a range of 200 to 700 degrees. In one embodiment, the power of the lower focal part 13 exceeds the power of the upper focal part 11 by 250 degrees, and the power of the lower focal part 13 is 450 degrees.

The first lens 10 can be made of resin, calcium fluoride or barium fluoride to have good light transmittance. and the second lens 20 can be made of resin, calcium fluoride, barium fluoride or glass. In some embodiments, the first lens 10 is a resin lens which has the advantages of light weight, safety, durability, and low cost. When making the first lens 10, resin is injected into a mold to obtain a molded blank, and the blank is processed into the first lens 10 according to the actual demand for diopter of the user's eyeball 4. Therefore, using resin as a material to make lenses can meet the shape requirements of special lenses such as aspheric lenses, and can simplify the manufacturing process.

Figure 7:
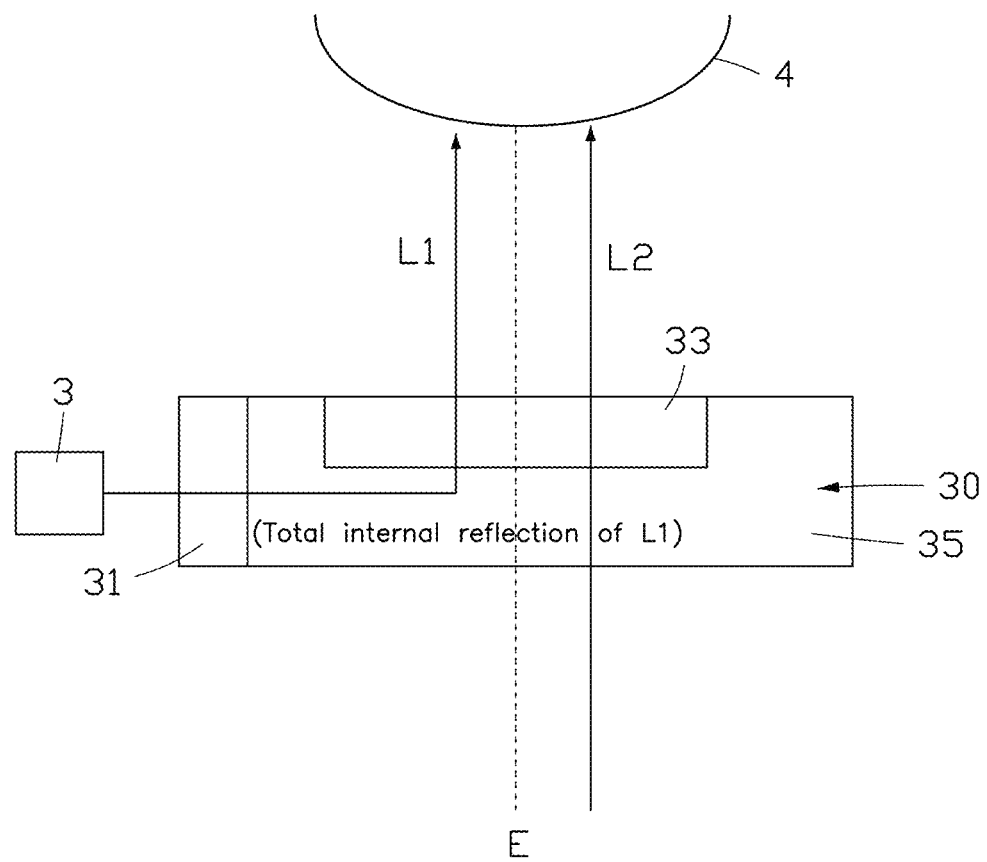
FIG. 7 is a functional schematic diagram illustrating the optical waveguide in FIG. 3.

The optical waveguide 30 has high light transmittance and is thin and light. The optical waveguide 30 is used to form a folded optical path. The optical waveguide 30 can be a diffractive optical waveguide. As shown in FIG. 7, the optical waveguide 30 includes a coupling grating 31, an outcoupling grating 33 and a waveguide substrate 35. The image light L1 emitted by the optical engine 3 enters the waveguide base 35 through diffraction of the coupling grating 31, undergoes multiple total internal reflections in the waveguide base 35 to the coupling grating 33, and is then transmitted to the front of the eyeball 4. The optical waveguide plate 30 is beneficial to improving optical performance without increasing or even reducing the volume of the optical lens 100. The optical waveguide 30 can allow the image light L1 to realize image proportional transfer without blocking the user's line-of-sight E, so that based on ensuring that the image light L1 and the natural light L2 are integrated into the AR image, the optical lens can 100 is closer to the shape of ordinary spectacle lenses. The optical waveguide 30 can further allow the image light L1 to realize two-dimensional pupil expansion, and increase the range of movement of the eyeball 4 in both directions while ensuring a small size and a large field of view, allowing the user to obtain a sense of immersion and a good visual experience. In addition, the optical waveguide 30 can adapt to the interpupillary distance of the eyes of different users, which is beneficial to market promotion.

Figure 8:
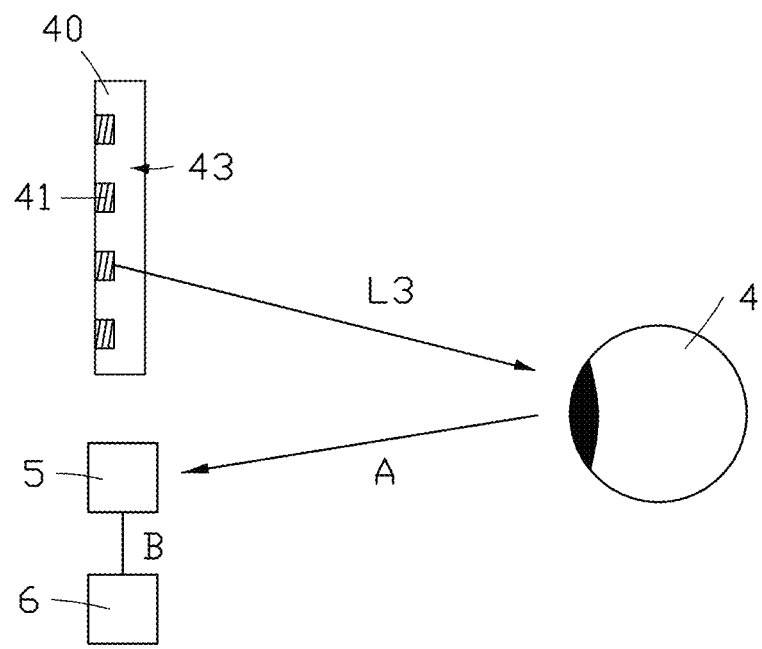
FIG. 8 is a functional schematic diagram illustrating the light emitting layer in FIG. 3.

The light emitting layer 40 includes at least one light emitter 41 and a protective layer 43. The protective layer 43 can be a protective glue, which is used to mold the light emitter 41 on the functional film layer 50. The protective glue includes silicone plastic with silicone resin as basic component, such as silicone. As shown in FIG. 8, the light emitter 41 may be an infrared light emitter or a near-infrared light emitter, and is used to emit detection light L3. The detection light L3 is infrared light or near-infrared light. The detection light L3 tracks the eyeball 4, and is reflected by the eyeball 4 to obtain the virtual image A of the human eye. The detection light L3 does not interfere with the user's reception of real-world ambient light, so a clear straight-eye image can be obtained.

The HUD 1 further includes a sensor 5 and a control device 6 electrically connected to the sensor 5. The sensor 5 is used to capture the virtual image A of the human eye to generate an eyeball sensing signal B. The control device 6 adjusts the image light L1 emitted by the light machine 3 according to the feedback of the eyeball sensing signal B, and cooperates with the algorithm of the control device 6 to further determine the gaze direction of the line-of-sight E, thereby realizing functions such as real-time tracking of the movement of the eyeball 4 and iris recognition.

The functional film layer 50 can be used to improve the display effect of the AR image, and includes, for example, optical functional films such as anti-reflection films, filters, polarizers, and diffusion films.

The optical lens 100 further includes transparent adhesive 60. As shown in FIG. 3, the transparent adhesive 60 includes a first transparent adhesive 61, a second transparent adhesive 62 and a third transparent adhesive 63. The first transparent adhesive 61 bonds the first lens 10 and the light emitting layer 40. The second transparent adhesive 62 bonds the functional film layer 50 and the second lens 20. The third transparent adhesive 63 bonds the second lens 20 and optical waveguide 30. A refractive index of the transparent adhesive 60 is in a range of 1.48 to 1.53. For example, the transparent adhesive 60 is optically clear adhesive (OCA). The OCA has high light transmittance and low haze.

Since the first lens 10 in the optical lens 100 includes at least two focal parts with different powers, the user's eyeball 4 remains abducted to form a telephoto state when looking near or far through the focal parts with different powers. The muscles attached around the eyeball 4 are relaxed when looking near, which is beneficial to reducing the pressure on the eyeball 4 due to the cohesion of the extraocular muscles and the contraction of the ciliary muscles, and relieving eye fatigue.

Since the HUD 1 utilizes the optical lens 100, the user can maintain a comfortable viewing effect when wearing the HUD 1 for a long time.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. An optical lens, comprising:
   a first lens comprising at least two focal parts with different powers;
   a second lens on a side of the first lens; and
   an optical waveguide on a side of the second lens away from the first lens;
   wherein the optical lens further comprises a protective layer and a light emitting layer, the protective layer is between the second lens and the first lens, the light emitting layer comprises a light emitter for emitting detection light to track eyeballs, and the protective layer is for molding the light emitter, so that the light emitter is between the second lens and the protective layer.

2. The optical lens of claim 1, wherein the first lens is a bifocal lens, a trifocal lens, or a quadfocal lens.

3. The optical lens of claim 1, wherein the first lens is a bifocal lens and comprises an upper focal part and a lower focal part, the lower focal part covers a surface of the upper focal part away from the second lens, the upper focal part is a convex lens or a concave lens, and the lower focal part is a prismatic convex lens.

4. The optical lens of claim 3, wherein the upper focal part and the lower focal part are integrally formed.

5. The optical lens of claim 3, wherein a power of the lower focal part is 100 to 300 degrees greater than a power of the upper focal part, and the power of the lower focal part is 200 to 700 degrees.

6. The optical lens of claim 3, wherein a power of the lower focal part is 250 degrees greater than a power of the upper focal part, and the power of the lower focal part is 450 degrees.

7. The optical lens of claim 1, wherein a material of the first lens is selected from a group consisting of resin, calcium fluoride, and barium fluoride.

8. The optical lens of claim 1, further comprising an optically transparent adhesive bonding the first lens and the light emitting layer.

9. The optical lens of claim 8, wherein the optically transparent adhesive has a refractive index in a range of 1.48 to 1.53.

10. The optical lens of claim 1, further comprising a functional film layer between the light emitting layer and the second lens, wherein the protective layer is for molding the light emitter on the functional film layer, and the functional film layer is selected from a group consisting of anti-reflection films, filters, polarizers, and diffusion films.

11. A head-mounted display (HUD), comprising:
    a frame;
    an optical lens mounted on the frame, wherein the optical lens comprises a first lens, a second lens on a side of the first lens, and an optical waveguide on a side of the second lens away from the first lens, and the first lens comprises at least two focal parts with different powers; and
    an optical engine mounted on the frame to provide image light to eyeballs of a user wearing the HUD through the optical lens;
    wherein the optical lens further comprises a protective layer and a light emitting layer, the protective layer is between the second lens and the first lens, the light emitting layer comprises a light emitter for emitting detection light to track eyeballs, and the protective layer is for molding the light emitter, so that the light emitter is between the second lens and the protective layer.

12. The HUD of claim 11, wherein the first lens is a bifocal lens, a trifocal lens, or a quadfocal lens.

13. The HUD of claim 11, wherein the first lens is a bifocal lens and comprises an upper focal part and a lower focal part, the lower focal part covers a surface of the upper focal part away from the second lens, the upper focal part is a convex lens or a concave lens, and the lower focal part is a prismatic convex lens.

14. The HUD of claim 13, wherein the upper focal part and the lower focal part are integrally formed.

15. The HUD of claim 13, wherein a power of the lower focal part is 100 to 300 degrees greater than a power of the upper focal part, and the power of the lower focal part is 200 to 700 degrees.

16. The HUD of claim 13, wherein a power of the lower focal part is 250 degrees greater than a power of the upper focal part, and the power of the lower focal part is 450 degrees.

17. The HUD of claim 11, wherein a material of the first lens is selected from a group consisting of resin, calcium fluoride, and barium fluoride.

18. The HUD of claim 11, further comprising an optically transparent adhesive bonding the first lens and the light emitting layer.

19. The HUD of claim 18, wherein the optically transparent adhesive has a refractive index in a range of 1.48 to 1.53.

20. The HUD of claim 11, wherein the optical lens further comprises a functional film layer between the light emitting layer and the second lens, the protective layer is for molding the light emitter on the functional film layer, and the functional film layer is selected from a group consisting of anti-reflection films, filters, polarizers, and diffusion films.

* * * * *